United States Patent Office

3,592,590
Patented July 13, 1971

3,592,590
FLUOSILICIC ACID PURIFICATION
Warren A. Knarr, Ponca City, Okla., assignor to
Continental Oil Company, Ponca City, Okla.
No Drawing. Filed June 18, 1969, Ser. No. 834,559
Int. Cl. C01b 7/22, 11/24, 33/10
U.S. Cl. 23—153                                   3 Claims

ABSTRACT OF THE DISCLOSURE

Fluosilicic acid containing impurities such as phosphorus pentoxide is purified by admixing it with sulfuric acid, heating the mixture to evolve hydrogen fluoride and silicon tetrafluoride vapors, sweeping the vapor space above the heated mixture with a superheated condensible gas such as steam, and absorbing the $SiF_4$ and HF vapors in water.

DISCLOSURE

This invention relates to purification of fluosilicic acid. In one aspect, the invention relates to a method for increasing the evolution of hydrogen fluoride from a mixture of impure fluosilicic acid and sulfuric acid.

Fluosilicic acid is obtained as a by-product from many phosphate-based fertilizer processes, and is typically recovered as a dilute and impure solution resulting from scrubbing fertilizer off-gases with water, a principal impurity comprising phosphoric acid or phosphorus pentoxide. Many uses of fluosilicic acid, such as treatment of potable water, require a low impurity level. It has long been known to effect its purification by admixing it with sulfuric acid and heating to generate a vaporous mixture of hydrogen fluoride and silicon tetrafluoride, and dissolving the evolved gases in water to reconstitute the fluosilicic acid according to the formula $2HF + SiF_4 + H_2O \rightarrow H_2SiF_6$ (aqueous). The problem with this process is that, although $SiF_4$ vapors are recovered easily from the acid mixture, hydrogen fluoride vapor pressure is low, as is its recovery. In an effort to increase hydrogen fluoride recovery it has been proposed to bubble various condensible and non-condensible gases through the liquid acid mixture or to subject the mixture to vacuum. These systems have variously suffered from requiring expensive equipment, subjecting the system to excessive heat load, diluting the product vapors evolved, or not appreciably increasing hydrogen fluoride recovery.

It is accordingly an object of the invention to provide a process whereby the evolution of silicon tetrafluoride and hydrogen fluoride from a mixture of impure fluosilicic acid and a mineral acid such as sulfuric acid can be increased in an economical manner.

Other aspects, objects, and the several advantages of this invention will become apparent upon study of this disclosure and the appended claims.

According to the invention, it has now been discovered that fluosilicic acid containing impurities such as phosphorus pentoxide can be purified by a process comprising mixing the impure acid with a thermally stable mineral acid such as sulfuric acid, heating the acid mixture, sweeping the vapor space above the acid mixture with an inert condensible sweep gas such as superheated steam, cooling the evolved vapors to condense the sweep gas, and absorbing the remaining evolved vapors in water to form purified fluosilicic acid. The heating of the acid mixture to cause evolution of vapors is preferably effected in a cascade evaporator arrangement, as is known in the art, although other types of evaporation can be used, such as plural serial evaporators or multiple-effect evaporators, as are known in the art. In a cascade evaporator arrangement, the superheated condensible sweep gas is preferably passed countercurrent to the mixed acid liquid flow.

It should be emphasized that the sweep gas is not passed through the mixed acid liquid, i.e. the invention does not involve a so-called steam or gas stripping of the liquid, but rather the sweep gas simply displaces, entrains, or carries away the vapors being evolved above the mixed acid liquid. Steam stripping or steam distillation of the acid liquid results in condensing a large portion of the stripping steam in the acid, with the result that the acid becomes greatly diluted. In contrast, by practice of the present invention, the concentrated sulfuric acid distilland containing phosphorus pentoxide undergoes virtually no dilution from the sweep gas and becomes enriched in $P_2O_5$, and is therefore eminently suitable to use as feed to the digestion step of a wet process phosphoric acid plant.

It has also been discovered that the steam sweep gas is preferably superheated at least about 15° C., preferably at least about 20° C. or more, prior to being used to sweep the vapors. This is the result of the hygroscopic nature of concentrated sulfuric acid which, unless the sweep gas is superheated, will become excessively diluted by absorbing steam.

The vapors evolved from the acid mixture comprise $SiF_4$ and HF along with the sweep vapor. Superheated steam is effective as the sweep vapor for the additional reason that it need not be separated from the product vapors, but rather can simply be condensed by scrubbing the entire vapor effluent stream directly with water, thus reconstituting the fluosilicic acid, now in purified form. Other sweep gases can be used, such as vaporized butanol or other condensible water-immiscible compound, although such usage is less preferred because of the additional step required to separate it from the purified acid product.

The impure fluosilicic acid feed to this process will typically be 20 to 30% $H_2SiF_6$, more usually about 21 to 26% $H_2SiF_6$, and will contain as a principal impurity $P_2O_5$ in an amount between about 1 and 10 weight percent, more usually about 1½ to 8 weight percent; the acid might additionally contain a minor amount, e.g. 0.5 to 1 weight percent, of organic carbonaceous material. The sulfuric acid used to regenerate or liberate the impure fluosilicic acid is as high as possible, preferably at least about 75 weight percent, and more preferably at least about 93 or more weight percent; oleum is also suitable. The product purified fluosilicic acid can be obtained in any desired concentration, depending upon the end use to which it is to be put, but will typically be in the range 15 to 25% $H_2SiF_6$, although concentrations as low as 6 weight percent and less are sometimes useful. This product acid will typically contain 0.2% or less $P_2O_5$, 0.2% or less $H_2SO_4$, and is water white and free of carbonaceous impurity.

The amounts of sulfuric acid and sweep gas to be used can vary widely, but the sulfuric acid is preferably used in excess as compared to the fluosilicic acid being treated, e.g. at least about 3:1 and preferably at least about 4:1 on a weight ratio, although little improvement is noted in using above about 10:1. The process is preferably operated on a continuous basis by admixing sulfuric acid and impure fluosilicic acid, flowing the mixture through the evaporator, and sweeping the vapor space of the evaporator with superheated steam. Steam is preferably used in amount at least about 0.3:1 on a weight basis compared to the impure fluosilicic acid, and more preferably at least about 0.5:1. Where the cost of steam is not a factor, additional steam yields improved results. As in most evaporative processes where a material not especially heat-sensitive is being treated, evaporation pressure is not critical, and can range from sub-atmospheric to super-atmospheric, although atmospheric pressure is presently preferred because of the decreased complexity of equipment required.

The invention will now be further explained by refer-

Example 1

Impure fluosilicic acid of about 25.6 weight percent $H_2SiF_6$ was continuously admixed at the rate of 1.5 g./min. with 93% strength sulfuric acid at the rate of 9.5 g./min. The admixture was flowed to a single-stage cascade type evaporator, and the vapor space above the evaporator was swept with steam at about 1 atmosphere pressure superheated to 120° C. at the rate of 1.5 g./min. 78 weight percent of the fluorine fed to the evaporator was evolved.

Example 2

Example 1 was repeated except that the steam was superheated only to 110° C.; 41% of the fluorine fed was evolved as vapor.

Example 3

Example 1 was repeated except that no vapor sweep was used; 67% of the fluorine fed was evolved.

Having thus described the invention by providing specific examples thereof, it is to be understood that no undue limitations or restrictions are to be drawn by reason thereof and that many variations and modifications are within the scope of the invention.

What is claimed is:

1. In the purification of impure fluosilicic acid containing $P_2O_5$ wherein said impure acid is admixed wth sulfuric acid, vapors comprising HF and $SiF_4$ are evolved from the admixture, and said vapors are dissolved in water whereby fluosilicic acid is reconstituted, the method of increasing the quantity of said vapors thus evolved which comprises sweeping at a rate of at least about 0.5:1 on a weight basis compared to said impure acid the space above said admixture with a superheated vapor which is at a temperature at least about 20° C. higher than its boiling point at atmospheric pressure, said vapor comprising steam or a condensible organic water-immisicible vapor.

2. The method of claim 1 wherein said vapor is steam at about 1 atmosphere pressure and superheated to at least about 120° C., and the weight ratio of said sulfuric acid to said impure acid is at least about 4:1.

3. The method of claim 1 wherein said vapor comprises butanol.

References Cited

UNITED STATES PATENTS

| | | | |
|---|---|---|---|
| 3,218,127 | 11/1965 | Houston | 23—153 |
| 3,218,128 | 11/1965 | Klem | 23—153 |
| 3,257,167 | 6/1966 | Mohr et al. | 23—153 |
| 3,322,497 | 5/1967 | Martin | 23—152 |
| 3,415,039 | 12/1968 | Rushton et al. | 55—71X |
| 3,455,650 | 7/1969 | Conte et al. | 23—153 |
| 3,501,268 | 3/1970 | Laran et al. | 23—153X |

EDWARD STERN, Primary Examiner

U.S. Cl. X.R.

23—205